(12) United States Patent
Wang et al.

(10) Patent No.: US 7,439,907 B2
(45) Date of Patent: Oct. 21, 2008

(54) NAVIGATION SIGNAL RECEIVER TRAJECTORY DETERMINATION

(75) Inventors: Chi-Shin Wang, Half Moon Bay, CA (US); David Wang, Belmont, CA (US); Wentao Zhang, Mountain View, CA (US); Jun Mo, San Jose, CA (US); Lei Dong, Cupertino, CA (US)

(73) Assignee: SIRF Technology Holdihgs, Inc., San Jose, CA (US)

( * ) Notice: Subject to any disclaimer, the term of this patent is extended or adjusted under 35 U.S.C. 154(b) by 38 days.

(21) Appl. No.: 11/561,758

(22) Filed: Nov. 20, 2006

(65) Prior Publication Data

US 2008/0117100 A1    May 22, 2008

(51) Int. Cl.
G01S 3/14    (2006.01)
(52) U.S. Cl. .............................. 342/357.02; 342/357.13
(58) Field of Classification Search ............ 342/357.02, 342/357.06, 357.13
See application file for complete search history.

(56) References Cited

U.S. PATENT DOCUMENTS

| | | | |
|---|---|---|---|
| 6,225,945 B1 | 5/2001 | Loomis | |
| 6,429,809 B1 | 8/2002 | Vayanos | |
| 6,559,793 B1 * | 5/2003 | Eschenbach | 342/357.03 |
| 6,570,530 B2 | 5/2003 | Gaal | |
| 6,707,420 B2 | 3/2004 | Vayanos | |
| 6,727,848 B2 | 4/2004 | Eschenbach | |
| 6,930,635 B2 | 8/2005 | Vayanos | |
| 2007/0152878 A1 * | 7/2007 | Wang et al. | 342/357.06 |

* cited by examiner

*Primary Examiner*—Thomas H. Tarcza
*Assistant Examiner*—Fred H. Mull
(74) *Attorney, Agent, or Firm*—Orrick, Herrington & Sutcliffe, LLP (57) ABSTRACT

The present invention provides methods and systems that enable a mobile navigation receiver to accurately determine its trajectory with non-current ephemeris in stand-alone mode. In an embodiment, the receiver computes the position for the same location using non-current ephemeris and current ephemeris at different time instances. The receiver then determines a position correction by finding the difference between these two computed positions, and applies this correction to the trajectory generated with non-current ephemeris to obtain a more accurate trajectory. In another embodiment, the receiver computes an initial position of the receiver using non-current ephemeris and finds the difference between the computed initial position and an accurate approximation of the initial position. The receiver then shifts the subsequent receiver trajectory computed using non-current ephemeris by the difference to obtain a more accurate trajectory.

18 Claims, 5 Drawing Sheets

GPS Receiver

FIG. 1A GPS Receiver

FIG. 1B

FIG. 2 USE OF E-COMPASS IN LARGE INDOOR AREA

FIG 3 USE OF MOTION SENSORS FOR INITIAL POSITION

FIG 4. INDOOR AREA WITH KNOWN DIMENSIONS

NAVIGATION SIGNAL RECEIVER TRAJECTORY DETERMINATION

FIELD OF THE INVENTION

The present invention relates generally to navigational receivers, and more particularly to systems and methods for determining the trajectory of a navigational receiver using non-current ephemeris.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The power associated with noncoherent integration with one millisecond correlation is $$\text{Power} = \sum_{n=0}^{N-1}(I(n)^2 + Q(n)^2)$$

and the power associated with coherent integration is $$\text{Power} = \left(\sum_{n=0}^{N-1} I(n)\right)^2 + \left(\sum_{n=0}^{N-1} Q(n)\right)^2$$

where $I(n)$ and $Q(n)$ denote the in-phase and quadra-phase parts of one-millisecond correlation values from the baseband section at interval n, and N denotes the desired number of one-millisecond integration intervals.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The ephemeris are used in the computation of the position of the satellites at a given time. The accuracy of the computed receiver position depends upon the accuracy of the satellite positions which in-turn depends upon the age of the ephemeris. The use of current ephemeris results in better position estimation than one based on non-current or obsolete ephemeris. Therefore it is necessary to use current ephemeris to get a precise receiver position.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as the in the case of previous 'hot start'. In the third mode, known as 'cold start', the receiver has no knowledge of position, time or ephemeris. As expected the 'hot start' mode results in low Time-To-First-Fix (TTFF) while in the 'warm start' mode the receiver may wait to download new ephemeris which may take more than eighteen seconds. The 'cold start' takes still more time for the first position fix as there is no data available to aid signal acquisition and position fix.

It is not always possible to maintain a copy of current ephemeris in the receiver. The reason may be that the receiver had no opportunity to download the ephemeris as it might have been in a powered off state for longer than four hours or because the received signal is very weak. Under these cases it is desirable to develop techniques to obtain better positioning accuracy with non-current ephemeris to reduce the warm start time. There are U.S. patents that disclose methods of fast signal acquisition in the presence of non-current ephemeris. U.S. Pat. No. 6,429,809, 6,707,420, 6,930,635, and published U.S. patent applications 2002/0154056, 2002/0149516, 2002/0130812, and 2003/0112176 by Qualcomm disclose methods for sending additional aiding information to receivers to provide correction due to the use of old ephemeris. U.S. Pat. No. 6,727,848 and U.S. patent application 2002/0186165 disclose aiding by a reference receiver or through DGPS. When aided by the reference receiver, the required correction is generated at the remote reference receiver. U.S. Pat. No. 6,225,945 assigned to Trimble Corp. obtains the position correction by integrating the velocity. While this method does not require current ephemeris for the computation of correction, it is less accurate. Thus, these methods require additional aiding stations or involve computation and may be less accurate.

Therefore, there is a need for methods and systems that enable a mobile navigation receiver to accurately determine its trajectory with non-current ephemeris in stand-alone mode and does not require a large computation load.

SUMMARY

Accordingly, the present invention provides methods and systems that enable a mobile navigation receiver to accurately determine its trajectory with non-current ephemeris in stand-alone mode.

In an embodiment, the receiver computes the position for the same location using non-current ephemeris and current ephemeris at different time instances. The receiver then determines a position correction by finding the difference between these two computed positions, and applies this correction to the subsequent receiver trajectory computed using non-current ephemeris to obtain a more accurate trajectory. The correction dependence on constellation change due to the entry of new satellites may also be taken cared of. Later, subsequent downloading of new ephemeris ensures the continued accuracy of the trajectory without the correction.

In an embodiment, the receiver computes an initial position of the receiver using non-current ephemeris and finds the difference between the computed initial position and an accurate approximation of the initial position. The receiver then shifts the subsequent receiver trajectory computed using non-current ephemeris by the difference to obtain a more accurate trajectory.

Various embodiments are provided for determining the approximate initial position of the receiver. In one embodiment, the position of the receiver is saved in memory when the receiver or a vehicle carrying the receiver is powered off. When the receiver or vehicle is powered back on, the saved position is used as the initial position. In another embodiment, the receiver uses an e-compass to determine the directions in which the receiver enters and exits an indoor area. If the detected directions are opposite, then the receiver may assume that the entrance and exit are co-located and use the saved position as the initial position. If the directions are the same, then the receiver may assume that the entrance and exit are not co-located and use the saved position as an approximation. In another embodiment, the receiver uses a motion sensor to detect motion of the receiver. The receiver may use the motion sensor in conjunction with the e-compass to determine the difference in position between the exit and entrance of an indoor area, and add this difference to the last saved position to obtain the initial position. In another embodiment, the user may input the initial position into the receiver. For example, the user may input the co-coordinates when passing a landmark whose coordinates are known. In another embodiment, the receiver may download the ephemeris in an outdoor environment when the TTFF is tolerable.

In another embodiment, the receiver detects when the receiver makes a transition between an indoor and outdoor environment in a sniff mode. The receiver may do this by periodically, e.g., every 30 seconds, testing received signal strength to determine whether the receiver is currently in an indoor or outdoor environment. In this embodiment, the receiver may automatically start acquiring and tracking satellite signals to compute receiver trajectory when an indoor to outdoor transition is detected and use the last saved position as the initial position to correct the computed trajectory.

In another embodiment, the user may manually enter a location or change in position into the receiver to correct the receiver trajectory. In this embodiment, when the user enters a location, the receiver computes the difference in position between the location entered by the user and the computed position at that time instance. The receiver then corrects the subsequent trajectory by shifting the computed trajectory by the difference. Thus, at any point the user finds an error in the computed trajectory including the initial position, the user may enter the correct location into the receiver to correct the trajectory.

An advantage of the present invention is that it does not require the reception of aiding information from reference stations or any external sources.

The above and other advantages of embodiments of this invention will be apparent from the following more detailed description when taken in conjunction with the accompanying drawings.

DETAILED DESCRIPTION

Figure 1A:
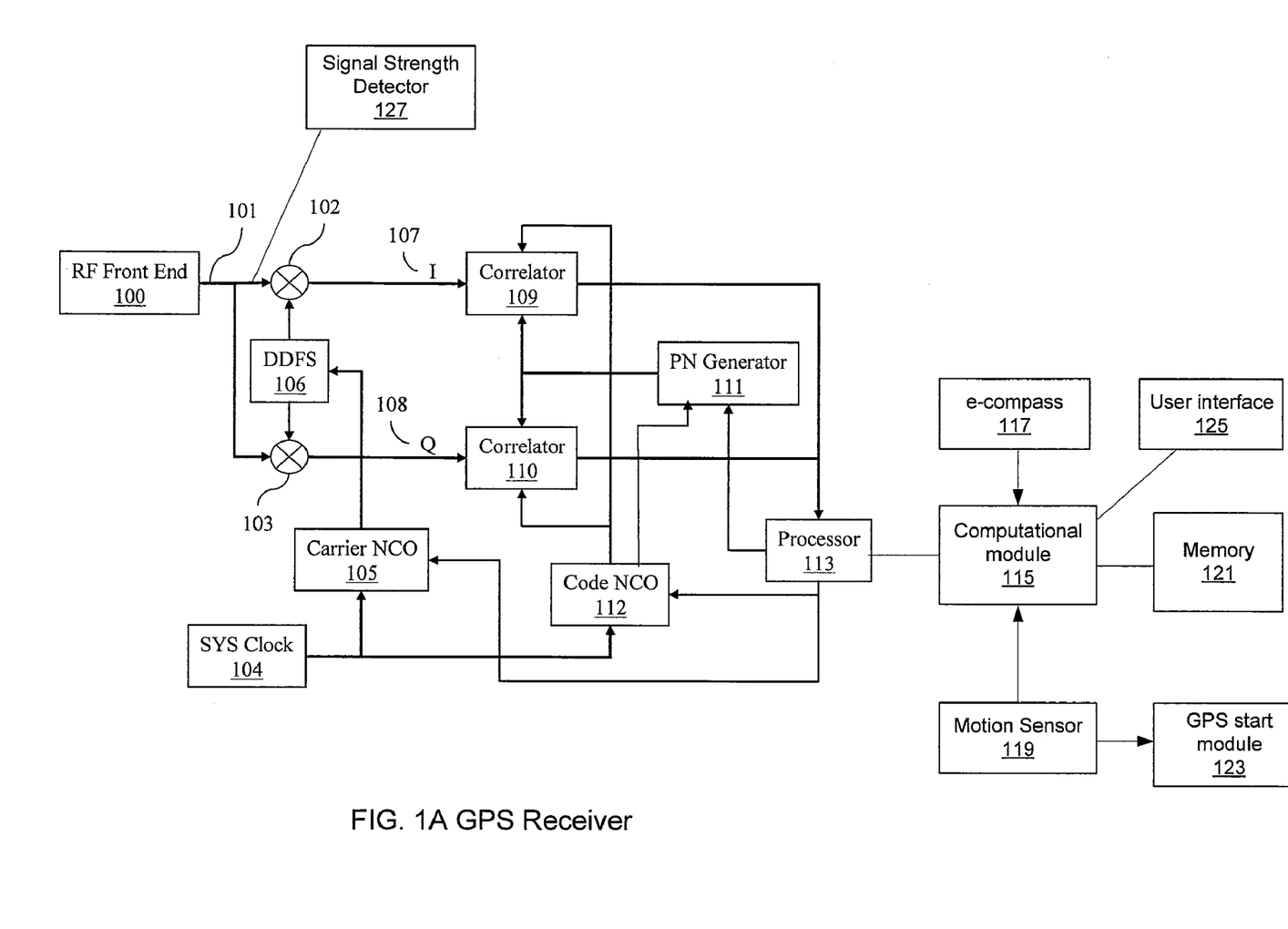
FIG. 1A is a block diagram illustrating a GPS receiver according to an embodiment of the present invention.

FIG. 1A illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

As shown in FIG. 1A, the GPS receiver also includes a computational module 115 that receives GPS measurements from processor 113. The computational module 115 may be implemented in software executed on hardware for performing various functions of the invention described further below. The receiver may also include an e-compass 117 for providing direction information and a motion sensor 119 for providing motion information. The motion sensor 119 may be a gyro-meter, accelerometer, pedometer or other sensor. As explained further below, the e-compass 117 and/or motion sensor 119 may be used to correct and enhance the GPS position information. In some embodiments the GPS is powered on when the motion sensor 119 sends a signal to a start module 123. The signal may be generated when the e-compass changes direction or when the motion detector detects motion from a standstill state. This signal is used to power on the GPS receiver. When activated, the start module 123 may power up the components necessary to acquire and track satellite signals including the RF-front end, the baseband section, etc. The receiver may further comprise a signal strength detector 127 for testing the received signal strength to detect indoor/outdoor transitions of the receiver, as discussed further below. The signal strength detector 127 may test the signal strength at the RF front end output or at another point in the receiver. The receiver also includes memory 121 for storing receiver positions, ephemeris and other data used by the receiver as described further below. The receiver may also include a user interface 125 for manually entering data into the receiver.

A GPS receiver uses the downloaded ephemeris to accurately compute the position of the visible satellites. Based on these satellite positions, the position of the receiver is estimated. This computed position is more accurate if the ephemeris used is current. In the case of GPS, the transmitted ephemeris are updated every two hours even though they are valid for a period of four hours. If the ephemeris is used beyond this period of four hours, the estimated satellite positions are less accurate causing an offset in the pseudorange, where the pseudorange is a first cut estimated distance of the satellite from the receiver with no correction applied for the receiver clock drift, atmospheric delay, etc. This pseudorange offset is approximately constant during a short period of time, e.g., two to three minutes, and therefore causes the computed position to shift from the true position. This offset is approximately constant over a short time interval as long as the satellite constellation has not been changed. If the satellite geometry or constellation changes, there is an additional shift in the position. Thus, it is necessary to download and use the current ephemeris to minimize this position error. However, it is not always possible to have the current ephemeris stored in the memory of the GPS receiver. One example is the case of a morning commute to the office where the GPS receiver is powered off for the remainder of the day and is not powered on again until the evening for the commute back home. The time gap is this case is more than four hours and the ephemeris becomes non-current. Also the visible satellites are different. Use of this non-current ephemeris results in a position estimation with a shift in position and thus a proper vehicle navigation can not be initiated. Further, there is a considerable delay if one opts to download new ephemeris from each of the satellites involved. This download requires eighteen seconds in addition to the signal track start time.

Figure 1B:
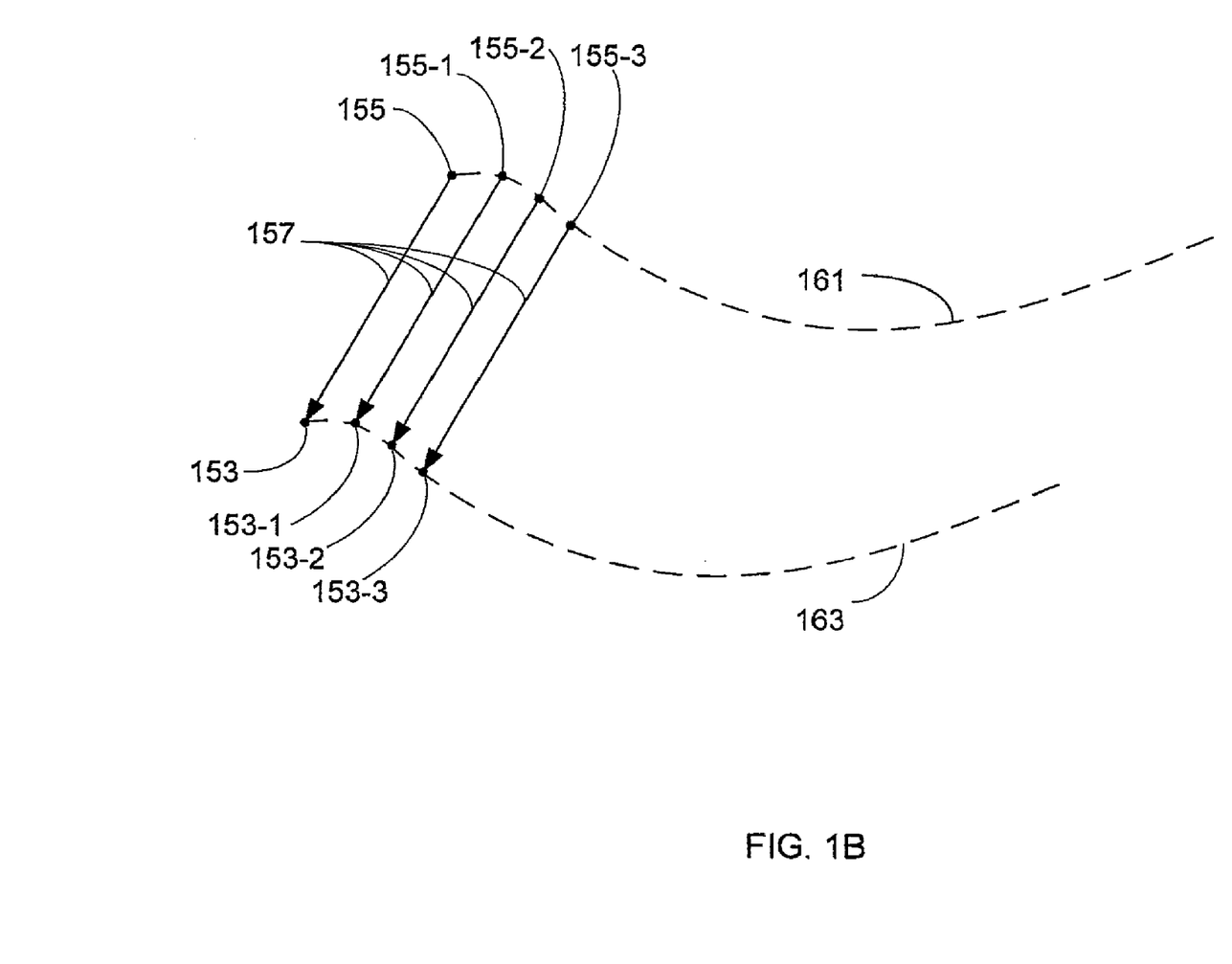
FIG. 1B illustrates a method for determining the trajectory of a mobile navigational receiver with non-current ephemeris according to an embodiment of the present invention.

Accordingly, for cases in which receiver has non-current ephemeris, the present invention provides fast methods and systems of estimating the error or shift in the position due to the non-current ephemeris. FIG. 1B illustrates a method of estimating the error or shift due to the non-current ephemeris, and using the error or shift to correct the computed trajectory of the receiver. In this embodiment, an accurate approximation of the initial position 153 of the receiver is assumed to be available to the receiver. The initial position 153 may be the position where the receiver was last powered off. This approximation holds well, e.g., when the receiver is powered off and powered back on at approximately the same location. Other methods for determining the initial position 153 of the receiver are given below. The receiver also computes the initial position using the non-current ephemeris, an example of which is represented by reference number 155 in FIG. 1B. The receiver then computes the difference in position 157 between the initial position 155 computed using the non-current ephemeris and the accurate initial position 153. This difference in position 157 provides an approximation of the error or shift due to the non-current ephemeris. The receiver corrects the subsequent receiver trajectory obtained with the non-current ephemeris by shifting this receiver trajectory by the difference 157. Thus the difference in position 157 provides the correction to be applied to the subsequent computed trajectory. An example of this is illustrated in FIG. 1B. In this example, the subsequent receiver positions 155-1, 155-2, 155-3, . . . computed using the non-current ephemeris trace out the receiver trajectory 161 obtained with the non-current ephemeris. Each of these subsequent positions 155-1, 155-2, 155-3, . . . computed using the non-current ephemeris is shifted by the difference 157 to obtain corresponding corrected positions 153-1, 153-2, 153-3, . . . which trace out the corrected receiver trajectory 163. The direction of the difference 157 shown is FIG. 1B is exemplary only as the actual difference may be in any direction. For ease of illustration only the first three subsequent positions are shown in FIG. 1B.

In some cases, the same location co-ordinates may be computed using current ephemeris and non-current ephemeris at different time instances. For the example in which the receiver is powered off and powered back on at the same location, the same location co-ordinates may be computed using current ephemeris at the time of power off and using non-current ephemeris at the time of power on. In this example, the ephemeris at power on may have become non-current due to a long time interval between power off and power on. Using these two computed positions, the subsequent receiver trajectory obtained with the non-current ephemeris can be corrected. This may be done by finding the difference between these two computed positions and shifting the subsequent receiver trajectory obtained the non-current ephemeris by the difference. Obviously, the two positions may be computed using different sets of satellites since different satellites may be visible at the power off and power on times.

Thus in most of the cases, the initial position gives the true set of co-ordinates of the location where the navigation receiver is powered on with non-current ephemeris. The ephemeris becomes non-current due to the long time duration between power off and power on. At power on, the difference in the position computed with the non-current ephemeris and the one computed with current ephemeris provides the correction to be applied. Thus, the approximated true position is a function of the position computed using the non-current ephemeris and the correction.

In another embodiment, the receiver may use a predicted satellite orbit or model instead of non-current ephemeris to estimate the satellite position for computing the trajectory of the receiver. Systems and methods for predicting satellite orbits based on historical navigation data stored in the receiver are disclosed in co-pending U.S. patent application, Ser. No. 11/558,614, titled "A Method and Apparatus in Standalone Positioning Without Broadcast Ephemeris," filed on Nov. 10, 2006, the specification of which is incorporated in its entirety by reference. The satellite orbit can be predicted based on historical broadcast ephemeris using a Kalman filtering algorithm or a least squares estimator. In this embodiment, the correction techniques of the present invention may also be used. The error due to the use of the predicted satellite orbit may be determined by finding the difference between the initial position computed using the predicted satellite orbit and the accurate initial position. The future trajectory may then be corrected by offsetting the trajectory with this determined error.

While the correction is applied to the computed position using the non-current ephemeris, the existing constellation may change with the addition of some new satellite. In this case, the pseudorange and clock errors of the new satellite has to be corrected before using it in the determination of the position. Otherwise a jump in the position may occur.

When the receiver is powered on in areas where multipath signals exists due to buildings in downtown areas or mountains or trees in other areas, the computed position is not accurate. In such case, it is necessary to correct these multipath effects to the maximum extent possible.

The trajectory computation and correction may be performed while the receiver is downloading new current ephemeris. Whenever the new ephemeris is available, it should be downloaded to compute the position with the proper correction for the pseudorange error. Once the new ephemeris is downloaded, the trajectory computation may be carried out using the current ephemeris. The trajectory needs to be validated as new ephemeris is downloaded and used in the computation. The advantage of this embodiment is that the receiver does not have to wait for the download of the new ephemeris before computing receiver trajectory. This is because, while the new ephemeris is being downloaded, the receiver computes the trajectory using non-current ephemeris and corrects this trajectory to obtain a corrected trajectory.

To perform the functions of the above embodiments, the computational module 115 may receive GPS measurements from the processor 113. Based on the received GPS measurements, the computational module 115 may compute the receiver trajectory, compute the correction, and apply the correction to the trajectory to generate the corrected trajectory. If the last saved position is used as the initial position, then the computational module 115 may retrieve this position from memory 121.

In another embodiment, the user may manually enter a location or change in position into the receiver via a user interface 125 to correct the receiver trajectory. The user interface 125 may be a touch screen, keypad, etc. In this embodiment, when the user enters a location, the receiver computes the difference in position between the location entered by the user and the computed position at that time instance. The receiver then corrects the computed receiver trajectory by shifting the computed receiver trajectory by the difference. Thus, at any point the user finds an error in the receiver position including the initial position, the user may enter the correct location into the receiver to correct the receiver trajectory. The user may enter the location by, e.g., pointing to the correct location on a map displayed on a touch screen of the receiver. For example, if the user is at two cross streets and the receiver indicates a different position, then the user can enter the location of the cross streets into the receiver. In this example, the receiver computes the difference between the location entered by the user and the computed position at that time instance. The receiver then shifts the computed receiver trajectory by the difference to obtain a corrected receiver trajectory. The receiver may shift both the computed trajectory prior to and subsequent to the location entry by the user.

Now methods for determining the initial position will be described according various embodiments of the present invention. These methods are intended to be exemplary only as any method for determining the initial position may be used with the present invention.

In an embodiment, when the receiver is moved from an outdoor environment to an indoor environment, the receiver position is saved in memory when the power button of the receiver is switched off. The receiver may be hand carried or vehicle mounted. The receiver may stay in the indoor environment for several hours, in which case the ephemeris saved in the receiver becomes non-current. Later when the receiver is moved from the indoor environment back to the outdoor environment, the power button may be switched on at the same location where it was switched off earlier. In this case, the receiver may determine the position error due to non-current ephemeris by finding the difference between the position computed using the non-ephemeris and the last saved position. This error may be used in the computation of the accurate initial position and later the trajectory of the moving receiver.

In an embodiment, the receiver detects outdoor signal reception conditions using a sniff mode. In this mode, the receiver periodically, e.g., every 30 seconds, turns on and determines the received signal power level through any process known in the art. One possible process is for the receiver to take some signal samples, and determine the energy and hence the power from the samples. If the power level is very low, then an indoor environment is assumed and the receiver goes to an inactive state or sleep mode for another, e.g., 30 seconds. On the other hand, if the power level is high enough to indicate a possible outdoor signal reception condition, then the receiver may continue to download the ephemeris and compute the current position. The time interval need not be 30 seconds, and can be any suitable time interval. Further, as long as the receiver knows the current ephemeris this power computation is not needed.

The receiver may use the sniff mode to detect when the receiver makes a transition between an indoor and outdoor environment by detecting a significant change in the received signal power level. For example, the change in power may be on the order of 10-20 or more dBs. In another example, the signal strength in an outdoor environment may be around 45 dB, while the signal strength in an indoor environment may be less than 25 dB. In this example, the sniff mode may use an intermediate signal strength value to make the judgment of whether the receiver is indoor or outdoor, with detected signals below the intermediate value indicting an indoor environment and detected signals above the intermediate value indicating an outdoor environment. The transition detected by the sniff mode may be used to detect when the receiver enters or exits an indoor area. For example, when the receiver detects an outdoor to indoor transition, the receiver may save the last position before entering the indoor environment. When the receiver detects an indoor to outdoor transition, i.e., exit from an indoor area, the receiver may used the position of entrance into the indoor environment as the initial position. The entrance position may be the last saved position taken when receiver detected the last outdoor to indoor transition.

In another embodiment, the receiver may automatically turn on and start acquiring satellite signals to compute receiver trajectory when a motion sensor 119 in the receiver detects motion from a standstill state. This may be used to detect an indoor to outdoor transition since the receiver must be moved when leaving a building. Thus, motion detectors may be used to detect motion and start the receiver to acquire satellite signals. If the receiver is on a vehicle, then the detected motion may be used to indicate that the vehicle has been started and is exiting an indoor environment, e.g., a garage. In this case, the receiver may get a position fix as soon as the vehicle moves so that the position fix is not too far from the last saved position.

In another embodiment, the receiver may automatically turn on and start acquiring satellite signals to compute receiver trajectory when the vehicle engine starts. Thus, when the vehicle is started, the receiver is also started. This may also be used to detect an indoor to outdoor transition when the vehicle is started inside an indoor environment, e.g., a garage, and is driven outside. In this embodiment, the receiver may record the last position when the vehicle is turned off and use the last saved position as the initial position when the vehicle is turned back on.

When the indoor area is small, the entrance and exit are approximately the same, and the last saved position provides a good approximation of the initial position at power on. When the indoor area is large and different routes are followed for entering and exit the indoor area, the receiver may use an e-compass 117 to detect the direction of entrance and exit. If the entrance and exit are different as may be the case of a large indoor area, the initial position at the exit will have some error. This error may be corrected if the distance difference between the entrance and exit is known else the position is indicated as less reliable.

Figure 2:
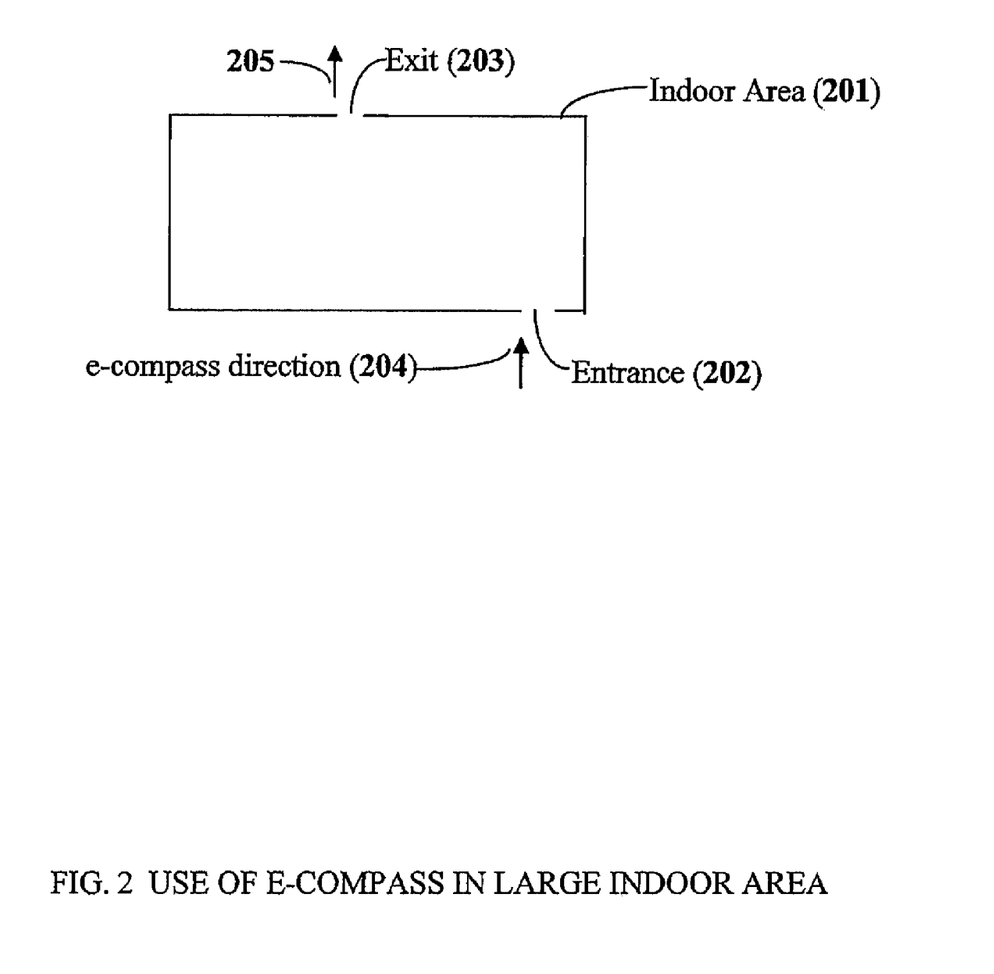
FIG. 2 illustrates the use of an e-compass in a large indoor area according to an embodiment of the present invention.

FIG. 2 illustrates the use of an e-compass 117. In FIG. 2 a navigation receiver enters a large indoor area 201 through entrance 202 with the e-compass 117 detecting the direction of entrance indicated by the direction of the arrow 204. The exit 203 is not at the same location as the entrance 202. Thus the initial position saved on the receiver does not match the exit location. This mismatch can be identified by the e-compass 117 as the direction of entrance and exit are the same, which can not happen if the entrance and exit are co-located. Thus the initial saved position is taken as an approximation and treated as such. Further, the receiver may assume that entering and exit directions are opposite when they are co-located even though other possibilities exist. The next assumption is that the e-compass directions may be the same or have some variation when the entrance and exit are not co-located. In FIG. 2 the e-compass directions 204 and 205 are the same and so the receiver assumes that the entrance and exit are located away from each other and the initial position is assumed not exact. Thus, the e-compass 117 can be used to validate whether the initial position can be the last saved position.

Figure 3:
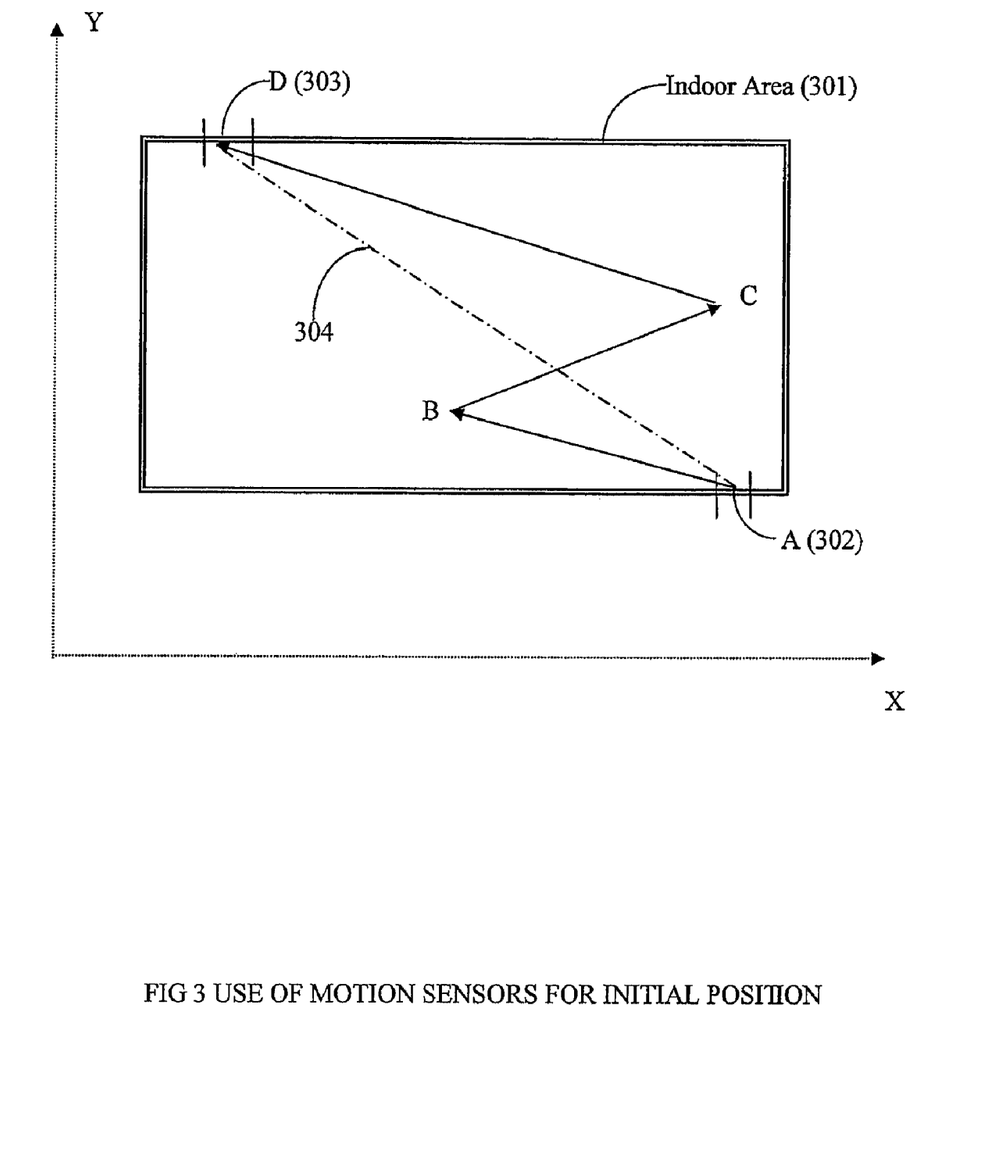
FIG. 3 illustrates the use of a speedometer and e-compass to correct a saved position according to an embodiment of the present invention.

A motion sensor 119, e.g., a speedometer, may be used in conjunction with the e-compass to trace the movement of the receiver in an indoor environment. The speedometer gives the effective distance traveled when the indicated speed is integrated over a time length in all the directions of movement. Thus the initial position of the receiver can be easily and accurately estimated at the exit. FIG. 3 illustrates the use of a motion sensor 119 and e-compass 117 with the receiver. In FIG. 3, the receiver is enters an indoor area 301 through the entrance A indicated as 302. The position saved in the receiver corresponds to position 302. Inside the indoor area the receiver moves from A to B, then from B to C and finally from C to D or the exit 303. The distances of vectors AB, BC and CD are determined using the speedometer and their directions are determined using the e-compass. The effective movement AD represented by 304 can be determined by adding the components of AB, BC and CD along the X and Y directions. The vector AD indicates the difference in position from the exit to the entrance. The new initial position at the exit can be determined by adding vector AD to the stored initial position when the receiver entered the indoor area.

Various physical sensors that may be used to determine the initial position include gyro-meters for direction estimation, accelerometers, pedometers and host of similar sensors. These sensors may provide the position or direction information at regular or irregular intervals or periodically or a-periodically. The sensors measurements may be obtained manually or automatically or according to a programmed pattern.

Figure 4:
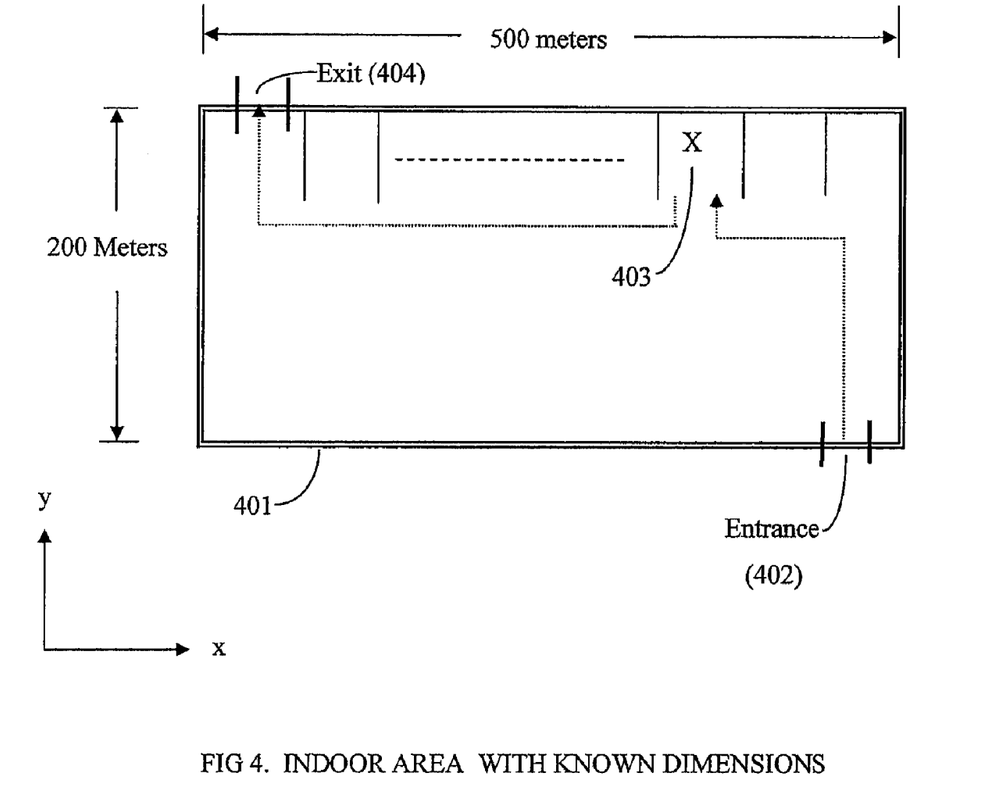
FIG. 4 illustrates initial position estimation based on approximate indoor dimensions.

In some cases, the user may manually input any corrections to the receiver computed position. One of the possible methods is entering the location co-ordinates when passing a landmark or similar point the co-ordinates of which is known. The user may enter the co-ordinates directly or enter an identification of the landmark or point with the receiver looking up the corresponding co-ordinates from a local database. In another approach that may be used in the indoor environment is correcting the initial position manually by knowing the approximate distance and direction from the entrance to the exit. FIG. 4 illustrates manually correcting the initial position in an indoor environment 401 of dimensions 500 meters in length and 200 meters in width. The receiver has the saved initial position corresponding to the entrance 402. The receiver is then placed at position X or 403 as indicated. After many hours the receiver is taken out through the exit 404 at which point it computes the position using the non-current ephemeris. In this example, the new initial position is the saved initial position plus a correction of approximately 500 meters in the x dimension and 200 meters in the y dimension.

In another embodiment, the user may manually enter the initial position into the receiver. For example, the user may point to the initial position on a map displayed on the receiver. In another embodiment, the receiver saves the receiver position when the receiver is powered off by the user and uses this saved position as the initial position when the receiver is powered back on. In this embodiment, the user may remember to power the receiver back on where he or she powered off the receiver to ensure the accuracy of the initial position.

If the receiver is in an outdoor environment, it may download the ephemeris and compute the initial position and no additional trajectory correction is needed.

In another embodiment, the receiver attempts to download current ephemeris when needed to keep the stored ephemeris current. To do this, the receiver may alternatively operate in a sleep mode and wake up mode to conserver power so that the required download can be accomplished with minimal power drain from the battery.

The sleep mode is a power saving mode, in which preferably only the components necessary to wake up the receiver from the sleep mode are operating with all unnecessary components are powered off. For example, the RF stage, baseband components, memory and main clock may be powered off in the sleep mode. Only a Real Time Clock (RTC) in the main platform may be operating. At intervals, which may be periodic, aperiodic, random or programmed, the receiver wakes up or is powered up in the wake up mode. During the wake up mode, the receiver performs a fast signal power detection procedure to determine the power level of the navigation signal. If the detected signal power level is at a sufficiently high level, the stored ephemeris is non-current and other conditions such as battery power, etc., are favorable, then the receiver proceeds to download the ephemeris. The receiver may check the age of the ephemeris before or after waking up to determine whether the ephemeris is current. If conditions are not favorable, e.g., power level is too low, then the receiver goes to sleep mode and attempts to download the ephemeris at the next wake up. After the download or unfavorable conditions, the receiver determines the next wakeup time and goes to sleep mode. In some cases, the receiver need not determine the wake up time and a program automatically determines the next wake up time.

In this embodiment, the receiver may operate in the sleep and wake up mode when the receiver is powered off by the user or the receiver is moved indoor, which can be detected by a drop in signal strength. When the receiver is powered on or moved outdoor, the receiver uses the current ephemeris to compute position if it is stored in the receiver. If the stored ephemeris is non-current, then the receiver may compute and correct the position obtained with non-current ephemeris while downloading the current ephemeris. When the download of the current ephemeris is complete, the receiver may switch to using the current ephemeris to compute the position.

The receiver may determine the next wake up time based on the age of the stored ephemeris. For example, the receiver may determine when the stored ephemeris for a satellite is due to expire, e.g., four or six hours after the time stamp on the ephemeris, and schedule the next wake up before the ephemeris expires. Also, the receiver may determine the next wake up time based on the time that the ephemeris for a satellite is to be updated, and schedule the next wake up when the ephemeris has been updated. The wake up time may also be based on usage patterns. For example, to conserve power, the receiver may be programmed not to wake up during a period of time that the user of the receiver is normally asleep. For example, the receiver may be programmed not to download in the early morning, e.g., 2 a.m., and/or to download more frequently just before the user wakes up, e.g., 8 a.m.

In another embodiment, if no signals can be acquired after several wake up trials, then the receiver may stop the background sleep/wakeup process until the user makes a manual start. This may be done so that the receiver does not waste power attempting to acquire signals in an indoor environment where no signals can be acquired.

In an embodiment, during wake up, the visible satellites can be predetermined by a prestored constellation based on the local time and the approximate receiver position. The approximate position may be the last saved position in the receiver. The satellite constellation may be derived from ephemeris or almanac, which give the positions of the satellites with time. Knowledge of the visible satellites at wake up enables the receiver to conserve power by only searching for the visible satellites. In an embodiment, the receiver searches for one of the visible satellites in all the available channels of the receiver to quickly acquire the satellite signal. The receiver then demodulates the data from the acquired signal to determine the GPS time. Once the GPS time is determined, the receiver can determine the bit edges of the other satellite signals, thereby reducing the search time for the other satellites. The receiver may then download the ephemeris from the different satellite signals in different channels of the receiver. Once the ephemeris of all the visible satellites have been downloaded, the receiver may either proceed to compute the position or go to sleep mode.

In another embodiment, the receiver may use navigation data which are known or can be computed such as HOW/TLM to perform data aided or partially data aided signal acquisition or tracking to reduce computation and increase sensitivity. Details on data aided acquisition and tracking can be found in patent application Ser. No. 11/548,204, titled "A Method of Mixed Data Assisted and Non Data Assisted Navigation Signal Acquisition, Tracking and Reacquisition," filed on Oct. 10, 2006, the specification of which is incorporated in its entirety by reference.

The trajectory dealt with in this disclosure pertains to the trajectory of the navigation receiver and may contain one or more computed positions.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A method of obtaining an accurate navigation receiver trajectory at a receiver, comprising:

computing a receiver trajectory based on non-current ephemeris or a predicted satellite orbit, wherein the predicted satellite orbit is generated at the receiver based on prior satellite navigation messages received by the receiver; and correcting the computed receiver trajectory to obtain a corrected receiver trajectory, wherein the corrected trajectory is a function of an approximate initial position and the computed receiver trajectory obtained using the non-current ephemeris or the predicted satellite orbit and, wherein correcting the computed trajectory comprises:

computing a computed initial position of the receiver using the non-current ephemeris;

computing a difference in position between the computed initial position and the approximate initial position; and
shifting the computed receiver trajectory by the difference.

2. The method of claim 1, wherein the approximate initial position comprises a last saved position when the receiver was turned off.

3. The method of claim 1, wherein the receiver is on a vehicle, further comprising:
when the vehicle is turned off, automatically saving a last position of the receiver and turning off the receiver; and
when the vehicle is started, automatically starting the receiver to acquire satellite signals, wherein the receiver uses the acquired satellite signals to compute the computed initial position with the non-current ephemeris and uses the last saved position as the approximate initial position.

4. The method of claim 1, further comprising:
detecting motion of the receiver with a motion detector; and
when motion is detected, automatically starting the receiver to acquire satellite signals, wherein the receiver uses the acquired satellite signals to compute the computed initial position.

5. The method of claim 1, further comprising:
detecting an indoor to outdoor transition of the receiver; and
when the indoor to outdoor transition is detected, automatically starting the receiver to acquire satellite signals, wherein the receiver uses the acquired signals to compute the computed initial position and uses a last saved position corresponding to an entrance of the indoor as the approximate initial position.

6. The method of claim 5, further comprising:
validating whether the approximate initial position can be the last saved position using an e-compass.

7. The method of claim 1, further comprising:
enabling a user to manually enter a location into the receiver at anytime beginning at the initial position or at any point of the trajectory; and
when the user enters the location, computing a difference in position between the entered location and a computed position; and
subsequently shifting the computed receiver trajectory by the difference.

8. A method of obtaining an accurate navigation receiver trajectory at a receiver, comprising:
computing a receiver trajectory based on non-current ephemeris or a predicted satellite orbit, wherein the predicted satellite orbit is generated at the receiver based on prior satellite navigation messages received by the receiver; and
correcting the computed receiver trajectory to obtain a corrected receiver trajectory, wherein pseudoranges and clock error of new satellites entering the constellation are corrected.

9. The method of claim 8, wherein the pseudorange of each satellite is corrected for multipath.

10. A navigation signal receiver, comprising:
a radio frequency (RE) front-end for receiving satellite signals;
a baseband section for processing received signals into correlation values;
a processor coupled to the baseband section; and
a computational module coupled to the processor, wherein the computational module computes a receiver trajectory using non-current ephemeris, and corrects the computed receiver trajectory to generate an accurate receiver trajectory, wherein the computational module corrects the computed trajectory by:
computing a computed initial position of the receiver using the non-current ephemeris;
computing a difference in position between the computed initial position and an approximate initial position; and
shifting the computed receiver trajectory by the difference.

11. The receiver of claim 10, wherein the approximate initial position comprises a last saved position when the receiver was turned off.

12. The receiver of claim 10, wherein the receiver is on a vehicle, and wherein when the vehicle is turned off, the computational module automatically saves a last position of the receiver, and when the vehicle is started, the processor automatically starts acquiring satellite signals, and the computational module uses the acquired satellite signals to compute the computed initial position with the non-current ephemeris and uses the last saved position as the approximate initial position.

13. The receiver of claim 10, further comprising a motion detector for detecting motion of the receiver, and wherein when motion is detected by the motion detector, the processor automatically starts acquiring satellite signals, and the computational module uses the acquired satellite signals to compute the computed initial position.

14. The receiver of claim 10, wherein the computational detects an indoor to outdoor transition of the receiver, and when the indoor to outdoor transition is detected, the processor automatically starts acquiring satellite signals, and the computational module uses the acquired signals to compute the computed initial position and uses a last saved position corresponding to an entrance of the indoor as the approximate initial position.

15. The receiver of claim 14, further comprising an e-compass for detecting direction, and wherein the computational module validates whether the approximate initial position can be the last saved position using the e-compass.

16. The receiver of claim 10, further comprising a user interface for enabling a user to manually enter a location into the receiver at anytime beginning at the computed initial position or at any point of the trajectory, and wherein when the user enters the location via the user interface, the computational module computes a difference in position between the entered location and a computed position, and subsequently shifts the computed receiver trajectory by the difference.

17. A navigation signal receiver, comprising:
a radio frequency (RF) front-end for receiving satellite signals;
a baseband section for processing received signals into correlation values;
a processor coupled to the baseband section; and
a computational module coupled to the processor, wherein the computational module computes a receiver trajectory using non-current ephemeris, and corrects the computed receiver trajectory to generate an accurate receiver trajectory, wherein pseudoranges and clock error of new satellites entering the constellation are corrected.

18. The receiver of claim 17, wherein the pseudorange of each satellite is corrected for multipath.

* * * * *